United States Patent
Azuma

(10) Patent No.: US 7,660,599 B2
(45) Date of Patent: Feb. 9, 2010

(54) BASE STATION AND TRANSMISSION POWER CONTROL METHOD

(75) Inventor: Tomohiro Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 11/476,136

(22) Filed: Jun. 28, 2006

(65) Prior Publication Data

US 2007/0010269 A1    Jan. 11, 2007

(30) Foreign Application Priority Data

Jul. 5, 2005    (JP)    ............................ 2005-196118

(51) Int. Cl.
H04B 7/00    (2006.01)

(52) U.S. Cl. ................ 455/522; 455/69; 455/13.4; 455/166.2; 455/512; 455/561; 370/335; 370/342; 370/479; 375/146

(58) Field of Classification Search ........... 455/522, 455/69, 13.4, 127.1–127.5, 166.2, 450, 509, 455/512, 561; 370/311, 328, 335, 342, 479; 375/146

See application file for complete search history.

(56) References Cited

U.S. PATENT DOCUMENTS

| | | | | |
|---|---|---|---|---|
| 5,943,340 | A * | 8/1999 | Iemura | 370/431 |
| 6,625,173 | B1 * | 9/2003 | Yanagi | 370/479 |
| 6,909,704 | B2 * | 6/2005 | Sakoda | 370/335 |
| 7,031,289 | B1 | 4/2006 | Nakayama | |
| 7,260,138 | B1 * | 8/2007 | Nakagawa | 375/146 |
| 2001/0027112 | A1 | 10/2001 | Voyer | |
| 2001/0046213 | A1 | 11/2001 | Sakoda | |
| 2002/0141505 | A1 | 10/2002 | Lundby | |
| 2005/0111391 | A1 | 5/2005 | Oki et al. | |
| 2005/0265292 | A1 * | 12/2005 | Atsuta | 370/335 |

FOREIGN PATENT DOCUMENTS

| | | |
|---|---|---|
| CN | 1311613 A | 9/2001 |
| EP | 1 011 207 A2 | 12/1999 |
| EP | 1 199 891 A1 | 4/2002 |
| EP | 1 603 251 A1 | 12/2005 |
| KR | 2005-045912 | 5/2005 |

OTHER PUBLICATIONS

An Office Action issued by the Chinese Patent Office, dated Feb. 6, 2009 (Chinese language with an English translation), 11 pages.

* cited by examiner

*Primary Examiner*—Matthew D Anderson
*Assistant Examiner*—Shaima Q Aminzay
(74) *Attorney, Agent, or Firm*—Foley & Lardner LLP

(57) ABSTRACT

A base station of the present invention performs transmission power control quickly with maintaining communication quality in mobile communications systems, by setting up priority about transmission power control and performing transmission power control sequentially from a channel with a high priority. A channel priority setting unit outputs priority information indicating priority for transmission power control about a plurality of channel information. A power calculation unit outputs total power information of all channels about the plurality of channel information. A power adjustment unit performs power adjustment to the channel information selected on the basis of the priority information when the total power information has larger value than maximum transmission power information.

8 Claims, 5 Drawing Sheets

BASE STATION AND TRANSMISSION POWER CONTROL METHOD

BACKGROUND OF THE INVENTION

1. Field of the Invention

The present invention relates to a base station combining a plurality of channel information divided as a unit of transmission power control from all the transmission channels and transmitting downlink data to mobile stations, and a transmission power control method, in mobile communication systems.

2. Description of the Related Art

Heretofore, in mobile communication systems based on Code Division Multiple Access (CDMA), transmission power control procedure which controls a transmission power to an optimal value based on reception quality is performed in downlink and uplink radio communication channels between a base station and mobile stations. Transmission power control of downlink is achieved in the mobile station by monitoring reception quality and sending control information on the basis of the reception quality to the base station. Also, transmission power control of uplink is achieved in the base station by monitoring reception quality and sending control information on the basis of the reception quality to the mobile station.

Particularly, as to the transmission power control of downlink, the base station increases transmission power to the mobile stations in order to maintain required communication quality in a situation that a number of call channels increases, a radio communication environment deteriorates, or the mobile station gets away from the base station. Increment of the transmission power causes waveform distortion in a transmission power amplifier. Therefore, the base station needs to limit the transmission power so that a total transmission power value to transmit downlink data to the mobile stations does not exceed a maximum transmission power value (upper limit of the total transmission power permitted) set up previously.

A technology of limiting the transmission power in the base station is disclosed in EP 1199819 A1. The base station controls a variable attenuator connected to input side of a transmission power amplifier in order to protect the transmission power amplifier, when the transmission power has approached an output power limit of the transmission power amplifier.

Next, a description will be given in more detail of the base station. FIG. 6 is a block diagram showing a configuration of a conventional base station.

In FIG. 6, the conventional base station 101 includes a channel combining unit 102, a digital-to-analog converter (D/A) 103, a mixer (MIX) 104, a variable attenuator 105, an amplifier (AMP) 106, a divider (HYD) 107, a detector 108, an analog-to-digital converter (A/D) 109, a controller 110, a transmission power amplifier (TPA) 111, and a local oscillator 112.

The channel combining unit 102 carries out additive combine of each of received signals (a pilot channel, a control channel, and a plurality of dedicated channels), calculates total power value from the combined signal, and outputs as total power information to the controller 110.

The controller 110 compares the total power information with maximum transmission power information set up previously. Next, the controller 110 compares the maximum transmission power information with the transmission power information (output power of the amplifier 106) output from the analog-to-digital converter 109, when the total power information has exceeded the maximum transmission power information. Furthermore, the controller 110 controls attenuation of the variable attenuator 105 connected to the input side of the amplifier 106 based on the comparative result. That is, the base station can protect the transmission power amplifier 111 by maintaining the transmission power information within the maximum transmission power information of upper limit.

However, in the base station disclosed in EP 1199819 A1, even if there is a transmission channel whose power fluctuation should be avoided, there is a problem that the whole transmission power is attenuated uniformly.

Aside from this conventional technology, in advance of this application, the applicant has proposed the base station which maintains a transmission power of specific transmission channel and can limit the total transmission power (see, U.S. patent application Ser. No. 11/137,384 (US2005/0265292 A1) and European Patent Appl. No. 05090159.4 (EP1603251 A1)).

The base station classifies all the transmission channels into a plurality of power classes (for example, a common control channel to all the mobile stations, a communication channel allocated to each of mobile stations, and so on) as a unit of transmission power control, and performs transmission power control for controllable power class. That is, the base station controls the transmission power of the controllable power class in which reduction of the transmission power is allowed, without reducing the transmission power of the control channel to avoid fluctuation of transmission power.

However, when communication channel allocated to each of mobile stations is scheduled to controllable power class of transmission power, there is a problem that the entire transmission power is attenuated uniformly, regardless of communication quality with which each of the mobile station is provided.

As described above, the conventional technologies may affect the quality of the entire communication channels allocated to each of the mobile stations, when the transmission power of the base station has exceeded the maximum transmission power information of upper limit set up previously.

SUMMARY OF THE INVENTION

The present invention has been made to solve the above and other exemplary problems, and therefore an exemplary feature of the present invention is to perform a transmission power control quickly with maintaining communication quality in mobile communications systems, by setting up priority about transmission power control and performing transmission power control sequentially from a channel with high priority.

In order to attain the above-mentioned and other exemplary features, the present invention provides an exemplary base station. The base station includes, a channel priority setting unit which outputs priority information indicating priority for transmission power control about the plurality of channel information, a power calculation unit which outputs a total power information of all channels about the plurality of channel information, and a power adjustment unit which performs power adjustment to a channel information selected on the basis of the priority information when the total power information has larger value than a maximum transmission power information.

Also, in order to attain the above-mentioned and other exemplary features, the present invention provides an exemplary transmission power control method. The transmission power control method includes, outputting priority information indicating priority for transmission power control about the plurality of channel information, outputting a total power information of all channels about the plurality of channel information, and performing power adjustment to a channel information selected on the basis of the priority information when the total power information has larger value than a maximum transmission power information.

According to the above configuration, the exemplary base station of the present invention can perform the transmission power control quickly with maintaining the communication quality in mobile communications systems, by setting up the priority about transmission power control and performing transmission power control sequentially from a channel with a high priority.

BRIEF DESCRIPTION OF THE DRAWINGS

The above and other exemplary features, and advantages of the present invention will become more apparent from the following detailed description when taken in conjunction with the accompanying drawings wherein.

DETAILED DESCRIPTION OF THE EXEMPLARY EMBODIMENTS

Figure 1:
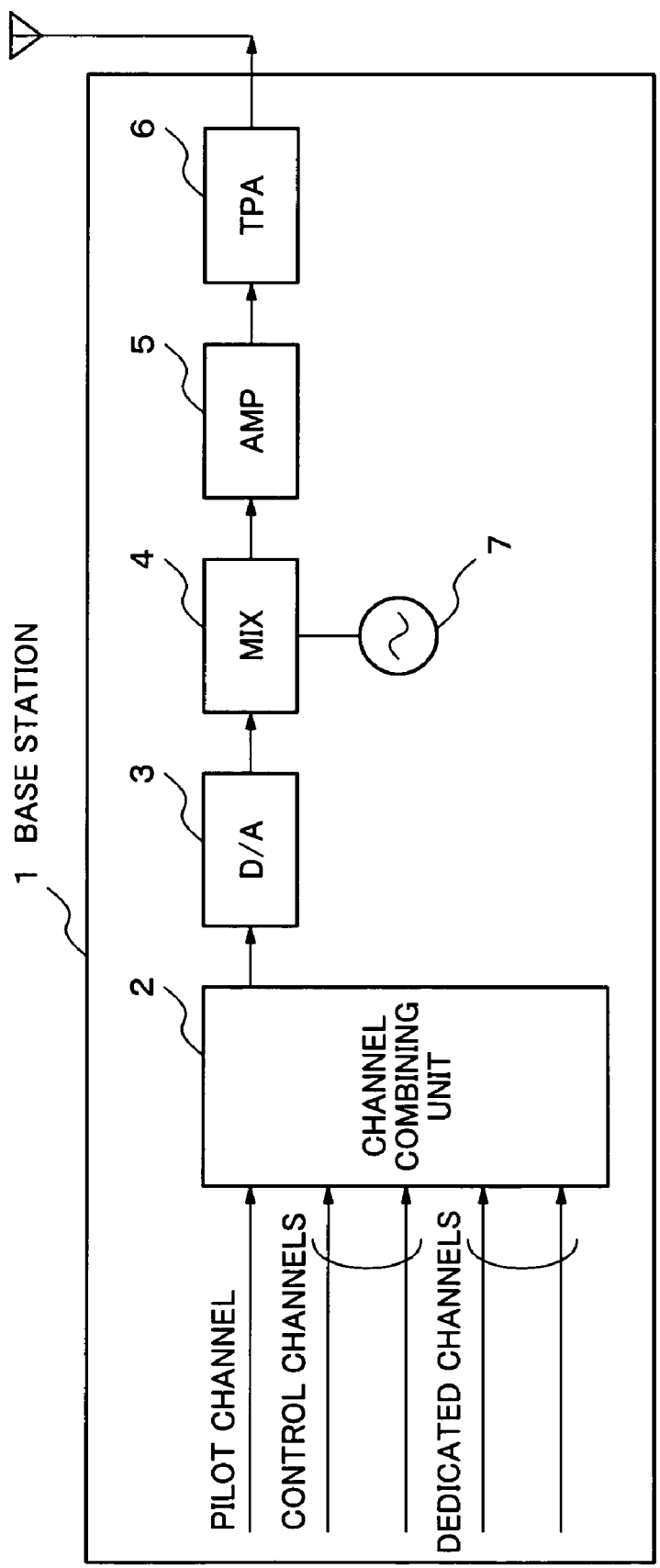
FIG. 1 is a block diagram showing an exemplary embodiment of a principal configuration of a base station according to the present invention.

Hereinafter, a description will be given in more detail of an exemplary base station according to the present invention with reference to the accompanying drawings. FIG. 1 is a block diagram showing an exemplary embodiment of a principal configuration of a base station according to the present invention.

Referring to FIG. 1, the base station 1 of the exemplary embodiment includes a channel combining unit 2, a digital-to-analog converter (D/A) 3, a mixer (MIX) 4, an amplifier (AMP) 5, a transmission power amplifier (TPA) 6, and a local oscillator 7.

The channel combining unit 2 receives a pilot channel, a plurality of control channels except for the pilot channel and a plurality of dedicated channels, and combines these channels (a plurality of channel information) and outputs as a downlink data to the mixer 4. Also, the channel combining unit 2 receives power information other than above-mentioned transmission data about each of channel, and calculates power values of each of the channels and a total power value of all the channels. Furthermore, the channel combining unit 2 compares the calculated total power value with maximum transmission power information set up previously, adjusts the power information of each of channel information or channel based on the comparative result.

Generally, a downlink channel is classified roughly into a common channel and a dedicated channel. In the common channel, there are a pilot channel which is used for demodulating (synchronous-detecting) downlink signal at a mobile station, a channel which transmits paging information, a channel shared by a plurality of mobile stations, and a synchronous channel which is used in a mobile station for the procedure of identifying a base station. The dedicated channel is a channel allocated to each of the mobile stations, and is used for transmission of information such as a sound and a picture.

The digital-to-analog converter 3 converts the downlink data (digital signals) output from the channel combining unit 2 into analog signals.

The mixer 4 mixes the analog signals output from the digital-to-analog converter 3 with a local signal output from the local oscillator 7, and outputs mixed signals to the amplifier 5.

The amplifier 5 amplifies the mixed signals output from the mixer 4 to a predetermined power level.

The transmission power amplifier 6 amplifies the signal output from the amplifier 5, and outputs to an antenna in order to transmit to mobile stations.

Figure 2:
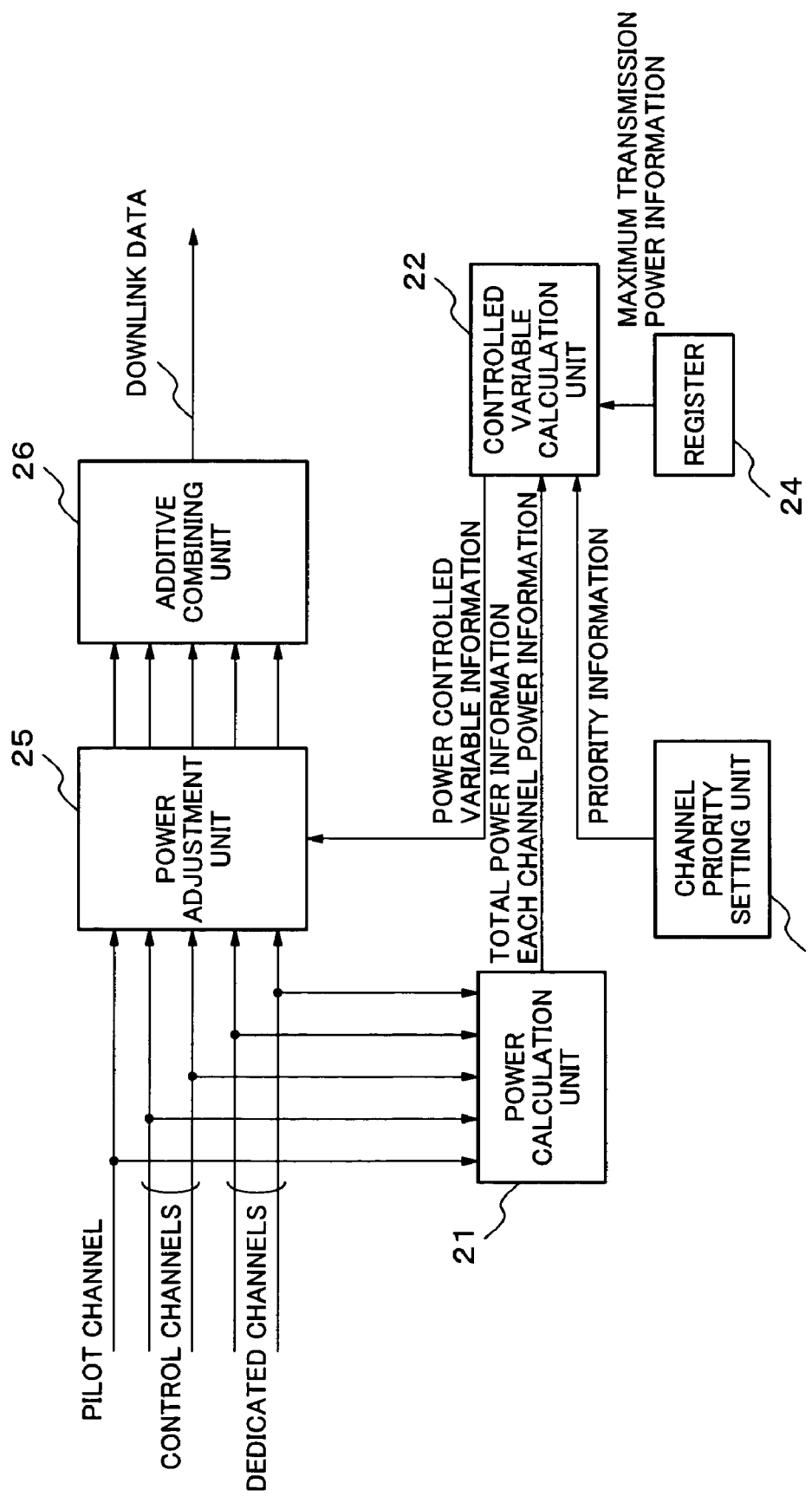
FIG. 2 is a block diagram showing a configuration of the channel combining unit shown in FIG. 1.

Next, a description will be given in detailed configuration of an exemplary channel combining unit according to the present invention. FIG. 2 is a block diagram showing a configuration of the channel combining unit shown in FIG. 1.

In FIG. 2, the channel combining unit 2 includes a power calculation unit 21, a controlled variable calculation unit 22, a channel priority setting unit 23, a register 24, a power adjustment unit 25, and an additive combining unit 26.

The power calculation unit 21 receives each of the channel information (a pilot channel, a plurality of control channels and a plurality of dedicated channels). Also, the power calculation unit 21 calculates transmission power values of each of the channel information and a total power value of total of the channel information from the power information of each channel, and outputs them as the power information (CH power information) of each of the channel information and total power information of total of the channel information.

The controlled variable calculation unit 22 receives each of CH power information and the total power information output from the power calculation unit 21 and priority information from the channel priority setting unit 23. Also, the controlled variable calculation unit 22 receives the maximum value (maximum transmission power information) of transmission power. Furthermore, when the total transmission power information exceeds the maximum transmission power information, the controlled variable calculation unit 22 sets up the power controlled variable to each of the channel information based on the priority information. The power controlled variable is output to the power adjustment unit 25 as a power controlled variable information.

The channel priority setting unit 23 sets up priority about transmission power control to each of the channel information, and outputs the priority information to the controlled variable calculation unit 22.

The register 24 stores various setting information which the base station 1 needs.

The power adjustment unit 25 receives each of the channel information, and adjusts each of the channel power information using power controlled variable information output from the controlled variable calculation unit 22.

The additive combining unit 26 additive-combines each of the channel information output from the power adjustment unit 25, and outputs to the digital-to-analog converter 3. At this time, order of addition is unspecified.

According to the configuration described above, the exemplary base station 1 according to the present invention receives each of the channel information, performs power adjustment to each of the channel information based on the priority of channel information, when the total power information added together about each of the channel information exceeds the maximum transmission power information. In other words, the base station 1 detects the input fluctuation caused by increase of communication channel and so on from the power information of each of the channels, and performs transmission power control by adjusting the electric power information.

Here, if the mixer 4, the amplifier 5, and the transmission power amplifier 6 operate in linear region, it is possible that the power value transmitted from the base station 1 is decided from total power of spreading baseband signals output from the channel combining unit 2, that is, from total of the power information of each of the channels. As far as adjustment operation of transmission power, the disclosures of U.S. Pat. No. 7,031,289 B1 and EP Patent No. 1,011,207 A2 are incorporated by reference herein. Therefore, the description is omitted.

Accordingly, the radio base station 1 can suppress the increase in control delay like the conventional technology, without feedback the output of the amplifier 5.

Figure 3:
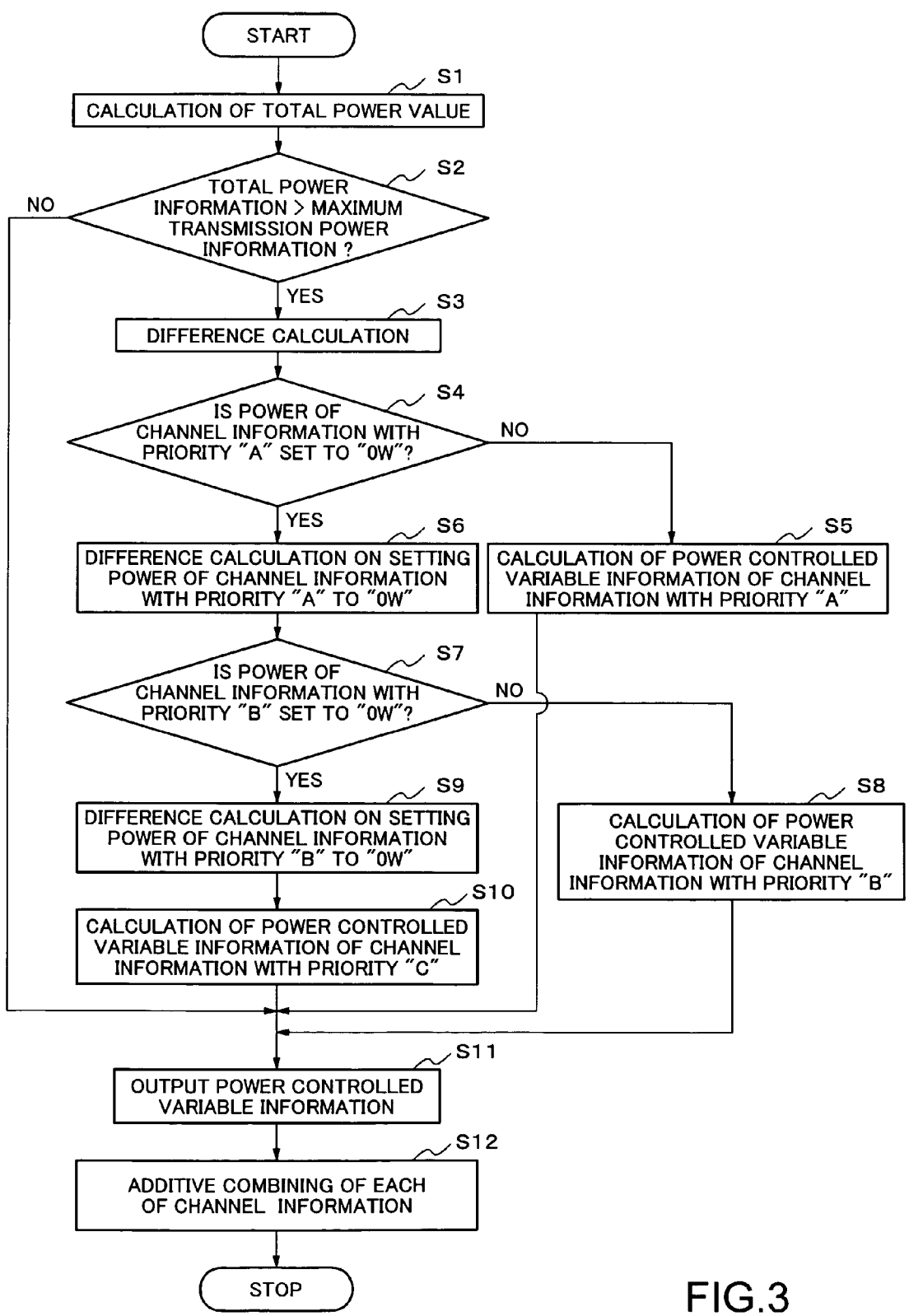
FIG. 3 is a flowchart for explaining an exemplary operation of performing a transmission power control in the base station shown in FIG. 1.

Next, a description will be given about operation of an exemplary base station according to the present invention. FIG. 3 is a flowchart for explaining an exemplary operation of performing a transmission power control in the base station shown in FIG. 1.

First, the channel priority setting unit 23 of the channel combining unit 2 sets an initial value of priority about transmission power control.

Here, the priority about transmission power control is set as follows. A plurality of dedicated channels is set to the priority "A" with the highest priority, a plurality of control channels except for the pilot channel is set to the priority "B" with a high priority in the second, and a pilot channel is set to the priority "C" with a high priority in the third.

Next, the power calculation unit 21 of the channel combining unit 2 receives each of the channel information (a pilot channel, a plurality of control channels and a plurality of dedicated channels), and calculates power values of each of the channel information and a total power value of total channel information by accumulating the power information on each of the channels. The calculated total power value is supplied to the controlled variable calculation unit 22 as the total power information.

The controlled variable calculation unit 22 compares the total power information output from the power calculation unit 21 with the maximum transmission power information set up previously in the register 24 (Step S2). The maximum transmission power information indicates the maximal value of transmission power allowed for the base station 1 to transmit.

When the controlled variable calculation unit 22 has judged that the total power information exceeds the maximum transmission power information, the controlled variable calculation unit 22 calculates the power difference of the total power information and the maximum transmission power information (Step S3).

Then, the controlled variable calculation unit 22 judges whether it is necessary to set the transmission power of the channel information of priority A to "0 W (watt)" based on the calculated power difference (Step S4).

Here, a description will be given when the total power information exceeds the maximum transmission power information by "2 W".

Figure 4:
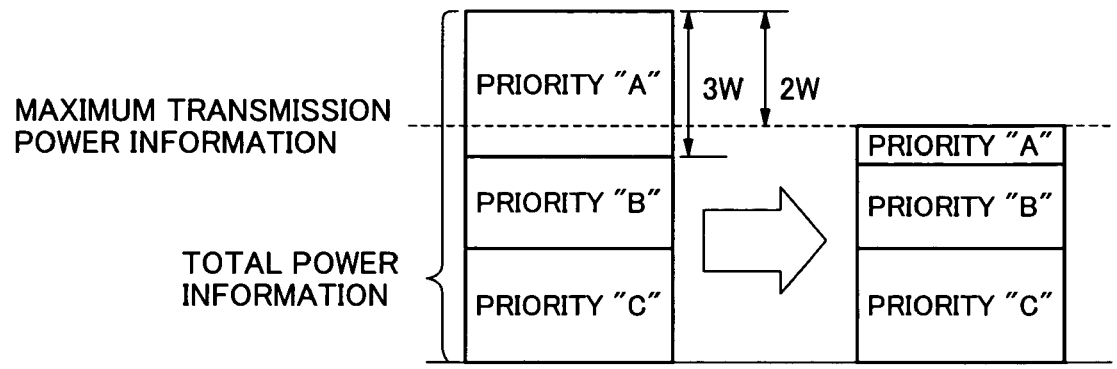
FIG. 4 is a diagram for explaining an exemplary operation of performing a transmission power control when not setting a transmission power of a channel with priority A to "0 W"
Figure 5:
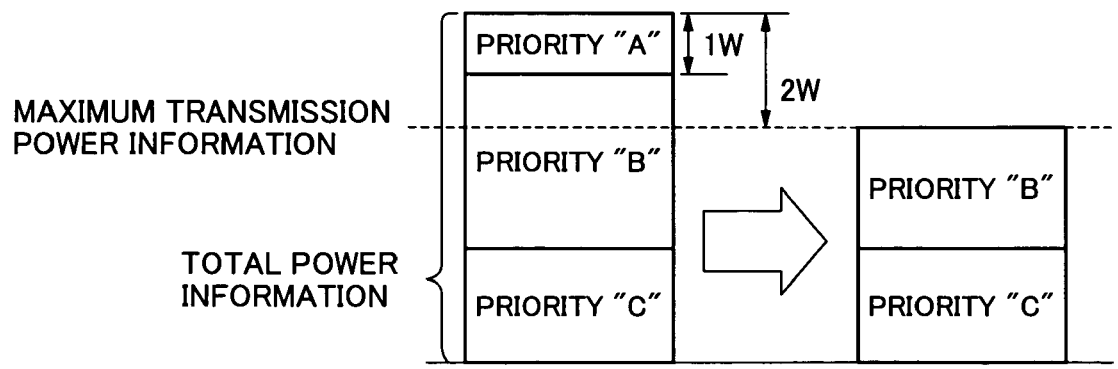
FIG. 5 is a diagram for explaining an exemplary operation of performing a transmission power control when setting a transmission power of a channel with priority A to "0 W"
Figure 6:
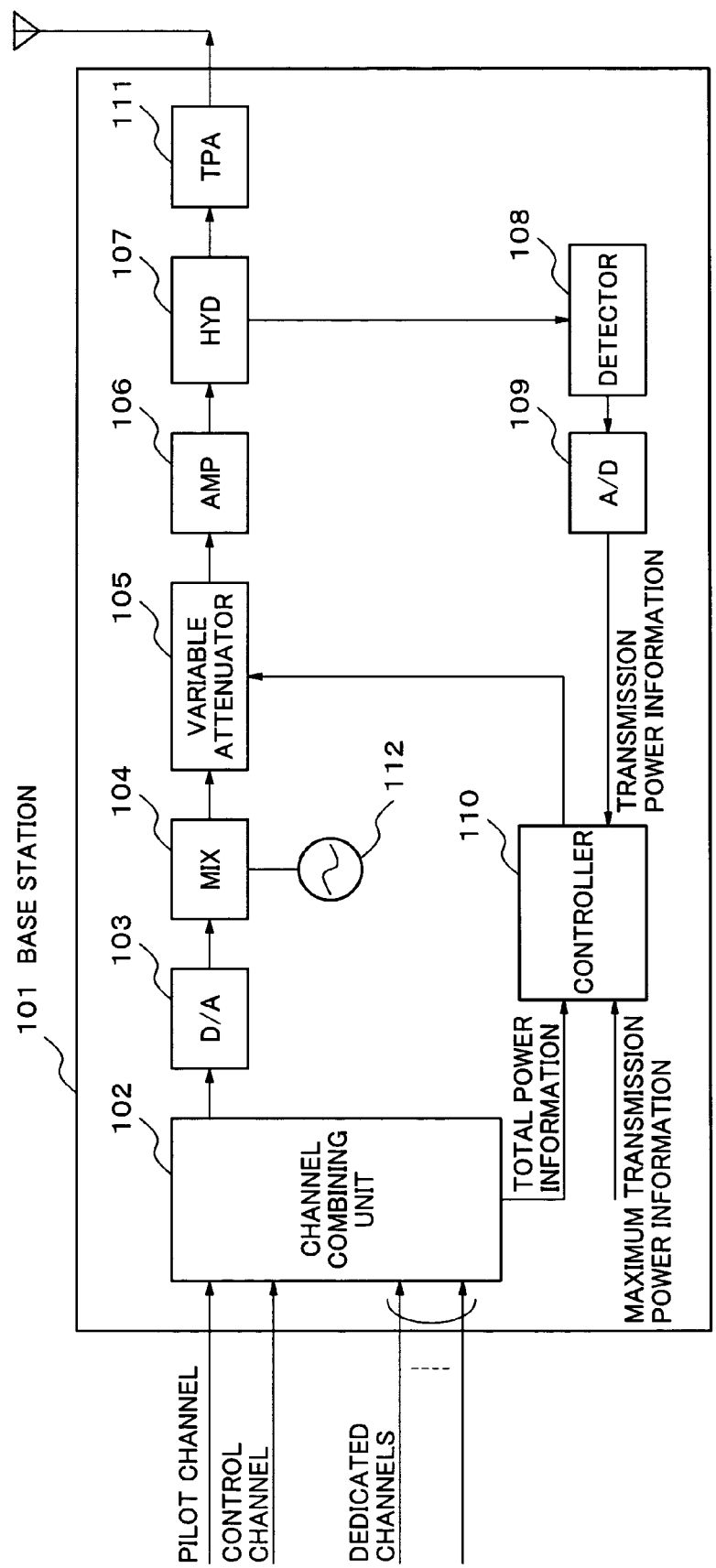
FIG. 6 is a block diagram showing a configuration of a conventional base station.

FIG. 4 is a diagram for explaining an exemplary operation of performing a transmission power control when not setting a transmission power of a channel with priority A to "0 W". FIG. 5 is a diagram for explaining an exemplary operation of performing a transmission power control when setting a transmission power of a channel with priority A to "0 W". Generally, although dB (decibel) is used as a unit of calculation of transmission power, W (watt) is used on the facilities of description here.

FIG. 4 shows in which the power difference of the total power information and the maximum transmission power information is "2 W", and the value of the power information of dedicated channel (priority A) is "3 W". Since the power difference of the total power information and the maximum transmission power information is "2 W", it is enough if the transmission power of dedicated channel is changed into "1 W" from "3 W". Therefore, it is not necessary to set the transmission power of dedicated channel to "0 W".

In Step S4, when the controlled variable calculation unit 22 has judged that it is not necessary to set the transmission power of the channel information with the priority A to "0 W", the controlled variable calculation unit 22 calculates the power controlled variable information for controlling the transmission power of dedicated channel of priority A (Step S5).

Here, the power controlled variable information is a multiplier coefficient for adjusting the present total power information to keep within the maximum transmission power information. In the example shown in FIG. 4, the power information of dedicated channel of priority A is "3 W", and the power difference of the total power information and the maximum transmission power information is "2 W". Therefore, in order to make the present total power information below into the maximum transmission power information, it is necessary that the power information of dedicated channel of priority A is set to 3 W−2 W=1 W. According to this reason, the multiplier coefficient, that is, the power controlled variable information, is calculated roughly as "0.3" from an arithmetic expression (1 W/3 W) to dedicated channel of priority A (Step S11).

On the other hand, FIG. 5 shows when the power difference of the total power information and the maximum transmission power information is "2 W", and the value of the power information of dedicated channel (priority A) is "1 W". Since the power difference is "2 W", it is necessary that the power information of dedicated channel of priority A is set to "0 W".

In Step S4, when the controlled variable calculation unit 22 has judged that it is necessary to set the transmission power of channel information with priority A to "0 W", the controlled variable calculation unit 22 sets the transmission power of dedicated channel of priority A to "0 W". Subsequently, the controlled variable calculation unit 22 adds the power information of control channel of priority B and the power information of pilot channel of priority C, and calculates a power difference of the added power value (all the remainder except priority A) and the maximum transmission power information (Step S6).

Next, the controlled variable calculation unit 22 judges whether it is necessary to set the transmission power of channel information with priority B to "0 W" based on the calculated power difference (Step S7). About the judgment method, the same step as that of the case of priority A mentioned above is performed.

When the controlled variable calculation unit 22 judges that it is not necessary to set the transmission power of channel information with priority B to "0 W", the controlled variable calculation unit 22 calculates the power controlled variable information for controlling the transmission power of control channel of priority B (Step S8). About the calculation method of the power controlled variable information, the same step as that of the case of priority A mentioned above is performed.

On the other hand, when the controlled variable calculation unit 22 has judged that it is necessary to set the transmission power of channel information with priority B to "0 W", the controlled variable calculation unit 22 sets the transmission power of control channel of priority B to "0 W". Subsequently, the controlled variable calculation unit 22 calculates the power difference of the power information of pilot channel of priority C (all the remainder except priority A and B) and the maximum transmission power information (Step S9).

And the controlled variable calculation unit 22 calculates the power controlled variable information for controlling the transmission power of pilot channel of priority C based on the power difference of the power information of pilot channel of priority C and the maximum transmission power information (Step S10). About the calculation method of power controlled variable information, the same step as that of the case of priority A mentioned above is performed.

Then, the controlled variable calculation unit 22 outputs the power controlled variable information on each of channel information calculated in Step 5, Step S8, and Step S10 to the power adjustment unit 25 (Step S11). At this time, the controlled variable calculation unit 22 outputs the power controlled variable information "0" about the channel information whose transmission power has been set to "0 W", and outputs the power controlled variable information "1" about the channel information which has not been calculated.

In Step S2, when the controlled variable calculation unit 22 has judged that the total power information is not larger than the maximum transmission power information, the controlled variable calculation unit 22 outputs the power controlled variable information "1" about all the channel information.

Following Step S11, the power adjustment unit 25 multiples by the power controlled variable information of each of channel information output from the controlled variable calculation unit 22 on power information of each of channel information, and outputs each of the channel information with adjusted power information. Subsequently, the additive combining unit 26 performs additive combining of each of the channel information output from the power adjustment unit 25, and outputs as downlink transmission data (Step S12).

In the power control mentioned above, when a channel information in priority intended for power control is not exist, power control is performed to a channel information of the next priority. And the procedure of power control is performed to last priority.

Moreover, when the channel priority setting unit 23 has set a plurality of channel information as the same priority, the power adjustment unit 25 may carry out the multiplication of the same power controlled variable information for each of the channels.

As mentioned above, the exemplary base station according to the present invention can maintain the communication quality in mobile communication systems by setting priority about transmission power control and performing power control sequentially from channel information with high priority. In other words, the base station 1 controls the transmission power of the channel information which is allowed to reduce transmission power by adjusting power information of received channels based on the priority, while maintaining the transmission power of the channel (or channel information) to avoid change of transmission power.

Next, a description will be given about another embodiment of the present invention. That is, the base station 1 according to another embodiment of the present invention can quickly perform transmission power control by setting priority to a channel with high power rate occupied to the total transmission power.

When a plurality of channels is contained in the same channel information, the channel priority setting unit 23 may set priority per channel. It is assumed to set the higher priority for the channel with high power, or set the higher priority for the channel with low spreading ratio, when setting priority per channel. Here, the spreading ratio is a ratio of bit rate (transmission data rate) and chip late (spread code rate), in spread spectrum communication such as Code Division Multiple Access.

If not only channels with high power but also channels with low spreading rate are set to the higher priority, transmission power control can be performed quickly.

Here, in daring to use the power information with each of the channels, the power calculation unit 21 may supply the power information of each of the channels to the controlled variable calculation unit 22 without performing power calculation of each of the channel information. The controlled variable calculation unit 22 supplies the controlled variable information in units of channel replaced from the controlled variable information in units of channel information.

When each of the channels has spreading ratio information respectively, the channel priority setting unit 23 sets the priority information based on the spreading ratio information, and supply it to the controlled variable calculation unit 22. Other procedures are the same as that of the case of the power information.

In addition, when all of power controlled channels is set to the same priority, it goes without saying that power control is uniformly performed for all the channels as well as the conventional technology.

The previous description of embodiments is provided to enable a person skilled in the art to make and use the present invention.

Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution. This application is based on Japanese Patent Application No. JP 2005-196118 filed on Jul. 5, 2005, and including a specification, claims, drawings and summary. The disclosure of the above Japanese Patent Application is incorporated herein by reference in its entirety.

What is claimed is:

1. A base station combining a plurality of channel information that is divided as a unit of transmission power control from all the transmission channels and transmitting to mobile stations as downlink data, comprising:

a channel priority setting unit which outputs priority information indicating priority for transmission power control about the plurality of channel information for the transmission channels that include dedicated channels set to a highest priority, control channels set to a next highest priority, and pilot channels set to a lowest priority;

a power calculation unit which outputs a total power information of all channels about the plurality of channel information; and a power adjustment unit which performs power adjustment to a channel information selected on the basis of the priority information when the total power information has larger value than a maximum transmission power information; and a controlled variable calculation unit which compares the total power information with the maximum transmission power information, calculates power difference of the total power information and the maximum transmission power information when the total power information has exceeded the maximum transmission power information, and outputs power controlled variable information to perform power control to the channel information with the higher priority before performing power control to the channel information with lower priorities.

2. The base station according to claim 1, wherein the controlled variable calculation unit sets the power controlled variable information to "0" when a transmission power of the channel information of the highest priority exceeds the power difference, and sets the power controlled variable information according to the power difference when not exceeding the power difference, and wherein the power controlled variable information is set as a fractional multiplier value that is based on the power difference.

3. The base station according to claim 1, wherein the controlled variable calculation unit sets the power controlled variable information according to power information, when a plurality of channels corresponding to each of the mobile stations exist in the channel information whose power is controlled and have the power information.

4. The base station according to claim 1, wherein the controlled variable calculation unit sets the power controlled variable information according to spreading ratio information, when a plurality of channels corresponding to each of mobile stations exist in the channel information whose power is controlled and have the spreading ratio information.

5. A transmission power control method of a base station combining a plurality of channel information that is divided as a unit of transmission power control from all the transmission channels and transmitting to mobile stations as a downlink data, comprising:

outputting priority information indicating priority for transmission power control about the plurality of channel information for the transmission channels that include dedicated channels set to a highest priority, control channels set to a next highest priority, and pilot channels set to a lowest priority;

outputting a total power information of all channels about the plurality of channel information; and performing power adjustment to a channel information selected on the basis of the priority information when the total power information has larger value than a maximum transmission power information; and comparing the total power information with the maximum transmission power information, calculating power difference of the total power information and the maximum transmission power information when the total power information has exceeded the maximum transmission power information, and outputting power controlled variable information to perform power control to the channel information with the higher priority, in which power control is performed to the channel information with the higher priority before performing power control to the channel information with lower priorities.

6. The transmission power control method according to claim 5, wherein the power controlled variable information is set to "0" when a transmission power of the channel information of the highest priority exceeds the power difference, and is set according to the power difference when not exceeding the power difference, and wherein the power controlled variable information is set as a fractional multiplier value that is based on the power difference.

7. The transmission power control method according to claim 5, wherein the power controlled variable information is set according to power information, when a plurality of channels corresponding to each of the mobile stations exist in the channel information whose power is controlled and have the power information.

8. The transmission power control method according to claim 5, wherein the power controlled variable information is set according to spreading ratio information, when a plurality of channels corresponding to each of mobile stations exist in the channel information whose power is controlled and have the spreading ratio information.

* * * * *